United States Patent [19]

Jarvis et al.

[11] 4,029,894

[45] June 14, 1977

[54] SUBMERGED REPEATER HOUSING

[75] Inventors: Frank L. J. Jarvis, Gravesend; Duncan A. Gunn, Bishops Stortford; Richard J. Buchanan, Shooters Hill, England

[73] Assignee: International Standard Electric Corporation, New York, N.Y.

[22] Filed: Aug. 22, 1975

[21] Appl. No.: 606,760

[30] Foreign Application Priority Data

Oct. 29, 1974 United Kingdom ............ 46742/74

[52] U.S. Cl. .................. 174/70 S; 220/319; 277/102; 277/188 R
[51] Int. Cl.² ...................................... H02G 15/14
[58] Field of Search ............ 174/18, 65 R, 65 SS, 174/70 S, 151, 152 GM; 220/319; 277/12, 102, 106, 110, 111, 112, 147, 188 R

[56] References Cited

UNITED STATES PATENTS

| 3,137,808 | 6/1964 | Coda et al. .......... 174/152 GM UX |
| 3,456,838 | 7/1969 | Chapman et al. ................. 220/319 |
| 3,608,912 | 9/1971 | Templin et al. ............... 277/102 X |

FOREIGN PATENTS OR APPLICATIONS

| 1,490,332 | 1/1969 | Germany ................... 174/152 GM |
| 847,858 | 9/1960 | United Kingdom ............. 174/70 S |

Primary Examiner—Laramie E. Askin
Attorney, Agent, or Firm—Thomas L. Peterson

[57] ABSTRACT

A submerged repeater or equalizer housing having a clamping ring therein which dishes and resiliently presses a bulkhead toward an annular seat to compress a seal therebetween. A modified cable outer conductor connection to the bulkhead improves high frequency return loss.

3 Claims, 1 Drawing Figure

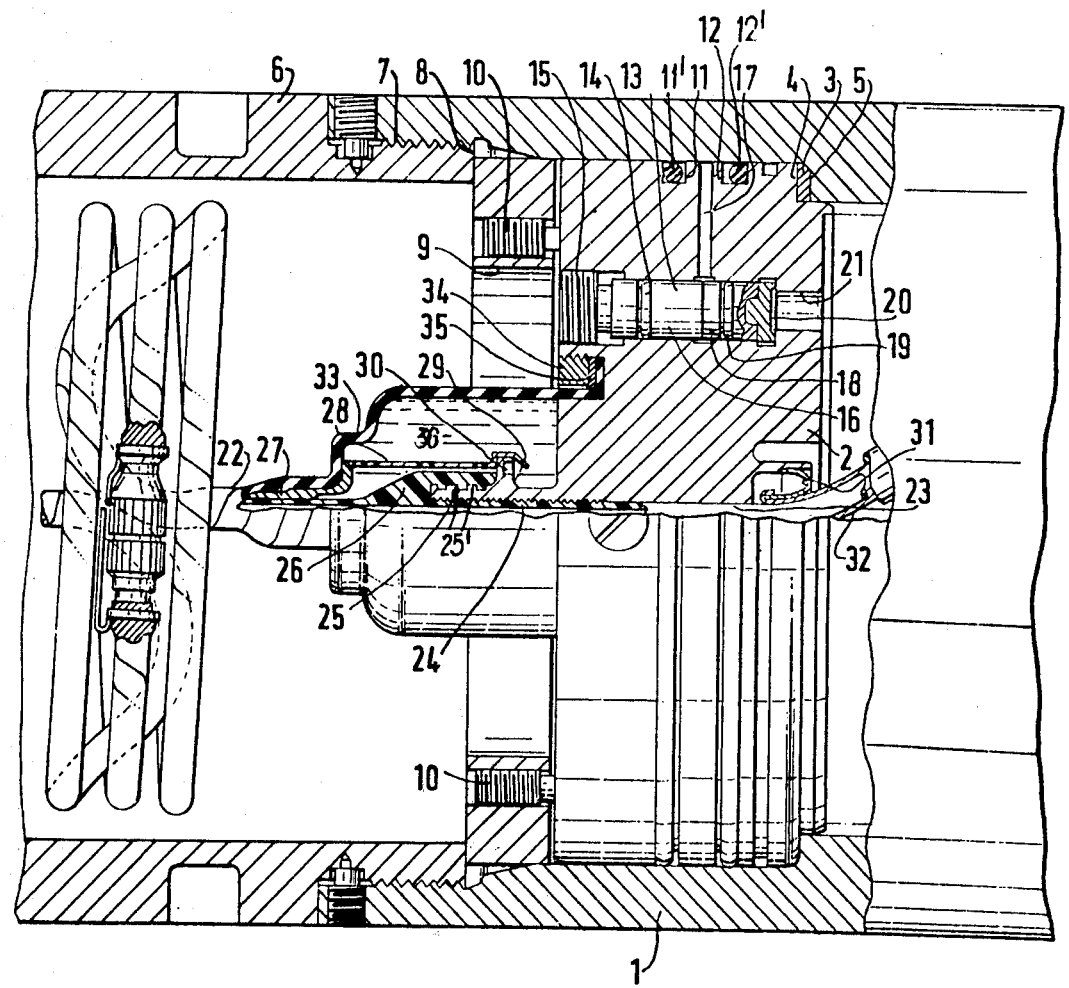

SUBMERGED REPEATER HOUSING

BACKGROUND OF THE INVENTION

This invention relates to housings for submarine cable repeaters and equalizers.

We have previously developed a repeater housing that has been successfully used in a submarine telecommunication system operating at frequencies up to 14 MHz. However, we are now contemplating a system operating at frequencies in the region of 45 MHz and the electrical impedance at the cable entry through the bulkhead of the original housing has not proved suitable. Furthermore, the clamping arrangement for clamping the bulkhead in the housing is expensive to produce. The purpose of the present invention is to overcome these deficiencies.

SUMMARY OF THE INVENTION

According to one aspect of the present invention there is provided a repeater housing comprising a tubular casing having an internal annular seat. A bulkhead fits in the casing adjacent to the seat. An annular seal is positioned between the seat and the bulkhead. An annular clamping ring is positioned in the casing in front of the bulkhead. A plurality of circumferentially-spaced-apart screws in the ring press the bulkhead toward the seat to compress the seal. The ring has more resilience than either the screws or the bulkhead in the axial direction of the casing. This housing is simpler and less expensive than the previous housing referred to above.

According to a further aspect of the present invention there is provided a repeater housing having a bulkhead and a coaxial cable sealed through the bulkhead in fluid tight manner. The cable has a plastic dielectric sealed to a spigot on the bulkhead coaxial with the cable. A tubular conductive member is electrically and mechanically connected to a flange on the spigot to provide electrical continuity between the outer conductor of the cable end and the bulkhead. This cable connection arrangement significantly improves performance over previous arrangements.

BRIEF DESCRIPTION OF THE DRAWING

The drawing is a partial longitudinal section through the repeater or equalizer housing of the present invention.

DESCRIPTION OF THE PREFERRED EMBODIMENT

Referring to the drawing in detail, a housing for a submarine cable repeater or equalizer comprises a cylindrical casing 1 closed at each end by a bulkhead 2. One end of the casing and one bulkhead only are shown.

The bulkhead 2 has a close sliding fit within the casing 1. An annular lead gasket 3 is squeezed between an annular seat 4 on the bulkhead 2 and a cooperating annular seat 5 inside the casing 1.

A further cylindrical portion 6 of the housing is screwed at 7 into the end of the casing 1 and provides an annular seat 8 for a clamping ring 9. As seen in the drawing, the radial thickness of the ring 9 is greater than the axial thickness thereof. The ring has a plurality of circumferentially spaced thrust screws 10 disposed in its inner region for urging the bulkhead 2 to the right as shown in the drawing.

When the screws 10 are screwed to each give a thrust of the order of 2.5 tons, the gasket 3 will be prestressed sufficiently to cause the lead to flow so as to make intimate contact with the adjacent steel faces of the bulkhead and the casing. The ring has more resilience than the screws 10 or bulkhead 2 in the axial direction. Hence, the ring 9 will be slightly "dished" and thus will act as a very strong spring well within its elastic limit. It provides a small amount of "follow up" without excessive loss of pressure in the event of slight subsequent extrusion of the lead gasket.

The bulkhead 2 has two annular grooves 11 and 12 containing elastic O-rings 11' and 12', respectively. The narrow annular space (not clearly shown in the drawing) between the external periphery of the bulkhead 2 and the facing internal periphery of the casing 1 between the two O-rings 11' and 12' contains petroleum jelly which may be introduced under pressure in order to check the sealing of the O-rings. On completion of the sealing check a piston 13 in the bulkhead and its O-ring 14 are used to seal the bore 16 communicating via a passage 17 with the narrow peripheral annular space between the O-rings 11' and 12'. The bore 16 also contains an inner sealing piston 18, an O-ring 19 and a copper seal 20. The sealing screw 15 is tightened to give a thrust of the order of 3.5 tons on the copper seal 20 to cause it to flow and so make an additional metal-to-metal seal.

The remainder of the bore 21 accommodates, prior to sealing off the bore with the piston and seal arrangement shown, a test lead arrangement (not shown) for testing the cable into which the electrical equipment in the housing is connected for the purpose of making equalization adjustments on board ship during laying of the cable. Subsequently this test lead arrangement is removed and the bores 16 and 21 are sealed with the arrangement described earlier.

In an alternative embodiment, the bore 16 would not extend completely through the bulkhead 2 but would instead merely communicate with the passage 17 for the purpose only of providing pressurized petroleum jelly in the space between the O-ring seals. In these circumstances, the equipment contained by the housing would be an amplifier arrangement (i.e. a repeater) to amplify the signals in the cable as opposed to equalization equipment in the embodiment described above. No adjustment of the repeater equipment is made on board ship and the housing is already sealed.

In both equalization and repeater arrangements the communication cable 22 is sealed through the bulkhead 2. The bulkhead has a coaxial bore 23 closely embracing the insulation 24 surrounding the central conductor (not shown) of the cable. The bulkhead 2 has a spigot 25 which has spaced ridges 25' in its outer surface. A cable gland of plastic material 26 is molded onto the spigot, thus sealing the cable insulation to the spigot. To provide electrical continuity, the outer conductor of the cable is connected at 27 to a cylindrical perforated conductor 28 which is soldered or welded to a radially projecting flange 29 on the spigot. The flange 29 has some material removed at 30 to minimize the flow of heat from the welding or soldering operation into the region of the cable gland 26, thus minimizing, if not eliminating, any adverse effect of the heat on the gland.

It has been found that by using the cylindrical connector member 28 closely surrounding the cable, by making the bore 23 closely surround the cable and, furthermore, by minimizing the axial thickness of the bulkhead, the high frequency performance over the region of the cable where it passes through the bulkhead is significantly improved over previous arrangements.

The electrical continuity of the outside conductor is continued through the bulkhead to an annular connection 31 to the outer conductor 32 of the cable inside the sealed compartment of the housing.

The cable gland and electrical connection around it are sealed by means of a neoprene bell 33 sealed at its small end to the cable and at its larger end to the bulkhead by means of an annular screw 34 and a clamp ring 35. The bell is filled with a fluid insulating compound 36 which also embraces the cable gland via the perforations in the connector member 28.

What is claimed is:

1. A submersible housing for submarine cable repeaters and equalizers comprising:
   a tubular casing having an internal annular seat;
   a bulkhead in said casing adjacent to said seat;
   an annular non-resilient seal between said seat and said bulkhead;
   a fixed annular clamping ring in said housing in front of said bulkhead; and
   a plurality of circumferentially-spaced-apart screws in said ring pressing said bulkhead toward said seat to compress said seal, said ring being constructed and arranged to act as a strong spring in the axial direction of said tubular casing to compress said seal in a resilient manner.

2. A submersible housing as set forth in claim 1 wherein:
   the radial thickness of said ring is greater than the axial thickness thereof.

3. A submersible housing as set forth in claim 1 wherein:
   said tubular casing has a fixed annular shoulder formed on the interior thereof facing said seat;
   the outer region of said ring engages said shoulder; and
   said screws are disposed in the inner region of said ring whereby said ring will dish when said screws are threaded toward said bulkhead.

* * * * *